Sept. 1, 1953     O. W. MARLOW     2,650,819
MECHANICAL SPRING
Filed May 12, 1948     2 Sheets-Sheet 1

Inventor
Owen W. Marlow

Sept. 1, 1953  O. W. MARLOW  2,650,819
MECHANICAL SPRING
Filed May 12, 1948  2 Sheets-Sheet 2
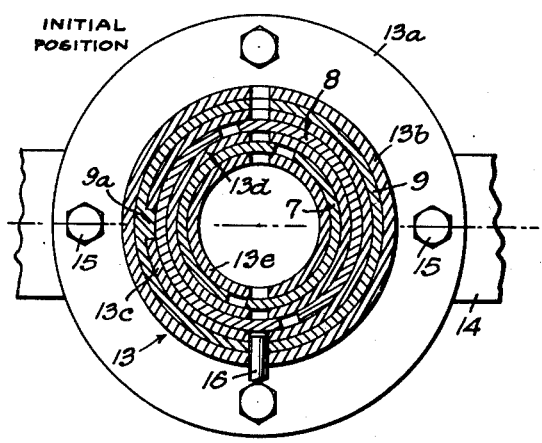
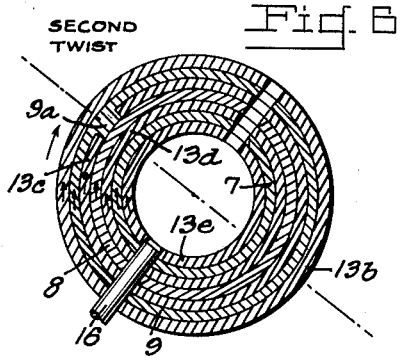
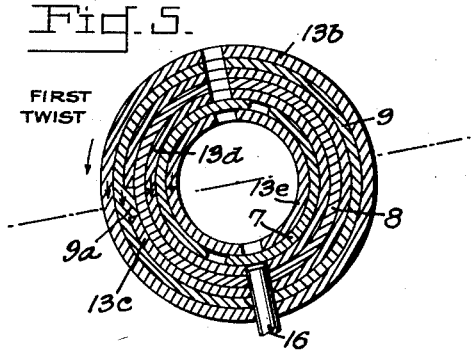
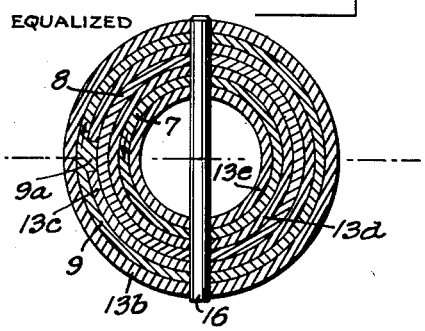
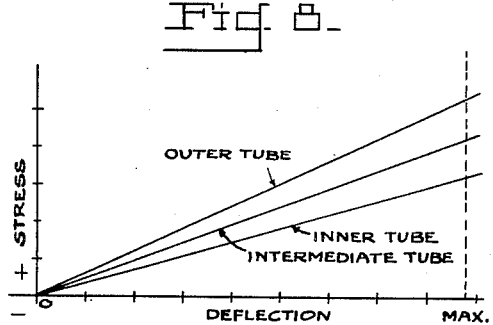
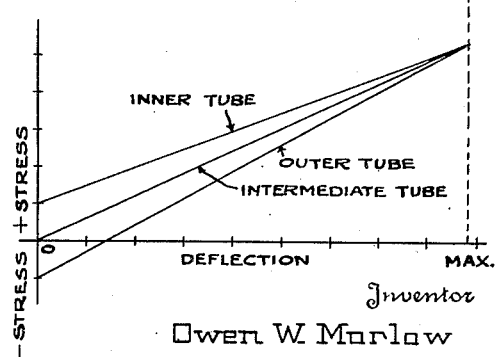
Inventor
Owen W. Marlow Patented Sept. 1, 1953

2,650,819

UNITED STATES PATENT OFFICE 2,650,819

MECHANICAL SPRING

Owen W. Marlow, Rock Island, Ill.

Application May 12, 1948, Serial No. 26,675

8 Claims. (Cl. 267—57)

(Granted under Title 35, U. S. Code (1952), sec. 266)

The invention described herein may be manufactured and used by or for the Government for governmental purposes without the payment of any royalty thereon.

This invention relates to mechanical springs, particularly those operating at high speeds in deflection. Although the invention is adaptable and applicable to any type of mechanical spring, it is especially useful in helical compression springs.

It is known that where a helical spring is closed at high speed the coils do not all close at the same time but in succession, one coil at a time. This successive closure results in a surge of the spring which, in turn, results in axial vibration and impact of the spring ends. As a result, there is set up a shock or vibration which decreases the effective thrust of a spring of any given size, slows down its action, and encourages breakage. Furthermore, where a spring is formed of a solid bar or rod, the maximum tension occurs at the outer fibres. For example, in a torsion spring consisting of a simple rod or tube of metal, for any given angle of twist within the working range, the stress increases in substantially straight-line proportion radially of the spring. If the spring be thought of as comprising a number of thin concentric tubular layers in cross section, then the permissible maximum torque of the spring is determined by the elastic limit of the metal in the radially outward layer. At the time when the outermost fibres are stressed by a given deflection, to the maximum permissible approach to the elastic limit, the successively inner layers will be below the permissible maximum stress so that a given spring cannot take the load that it could were all layers equally stressed. Or, stated conversely, since a spring is usually designed to exert a determined or assumed maximum thrust or torque, a spring to exert a given or assumed thrust or torque could be made smaller and lighter in weight if all layers could be made to reach the maximum permissible stress at the same time.

It is primarily the object of the invention to provide a spring wherein for a given maximum deflection thereof, all fibres of the metal comprising the spring are equally stressed.

A second object is to effect the foregoing purpose by a spring made up of a plurality of concentric or telescoped sections some of which are pre-stressed in a predetermined manner.

Another object is to provide a spring which effectively reduces surging and other undesirable actions therein.

Still another object is the provision of multi-section spring wherein, one or more sections are negatively stressed, when the composite spring is in position of zero deflection while others are positively stressed, whereby the spring returns to zero deflection with a smooth, uniform-decelerated motion.

Another object is to provide a novel method of manufacture of a spring having the characteristics announced in the foregoing paragraphs.

Other objects and advantages will become apparent from a study of the following description in connection with the accompanying drawing wherein, Figure 1 is an elevation, partly in section, of a coil spring embodying the invention;

Figure 4 is a section taken in a plane indicated by the line 4—4, Figure 2, and showing the parts in initial position prior to pre-stressing;

Figures 5, 6 and 7 are sectional views corresponding to Figure 4 and showing the angular rotational positions of the concentric tubes during the various steps of pre-stressing;

Figure 8 is a stress-deflection diagram for a three-tube composite spring when not pre-stressed; and Figure 9 is a stress-deflection diagram for the same spring when portions thereof are pre-stressed.

Figure 1:
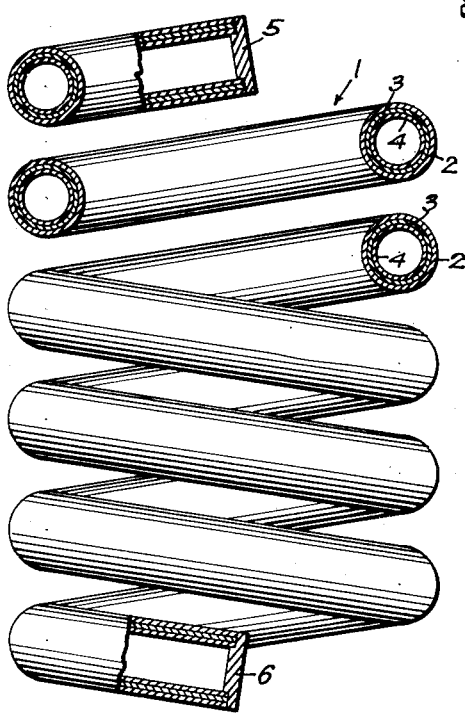

In Figure 1 is shown a coil spring generally indicated at 1 and consisting of three interfitting or telescoped coaxial tubes, namely, an outer tube 2, an intermediate tube 3, and an inner tube 4. While three tubes are shown, it will be understood that this is purely illustrative and that, within practical limits, a larger number of tubes may be used. Each inside tube has a generally smooth fit within the next adjacent tube. All tubes are rigidly secured together at their ends, as by caps 5 and 6, Figure 1.

In constructing the spring of Figure 1 the necessary lengths of tube sections are cut off and inserted one within the other. The sections may then be securely united at one end as by welding or in any other suitable manner. The inner and outer sections are then equally and oppositely pre-stressed by amounts subsequently explained. Then, while so pre-stressed, the sections are rigidly united at the remaining end. When a simple torsion tube is to be used, no further steps in the construction of the spring proper, are required. When a coil tension or compression spring is to be constructed, the sections, united in the manner just described, are coiled into the desired form in a conventional manner. Where it is desired to avoid any substantial friction between the tube sections they may be initially formed to fit loosely one within the other so that no binding or friction is present after the assembled sections are coiled. Alternatively, particularly where the completed spring is of relatively short length, the several sections may first be separately and individually coiled, and then assembled one within the other, by a twisting or "threading" movement. After assembly, the sections are united at one end, pre-stressed as previously described, and then united at the other end.

Figure 2:
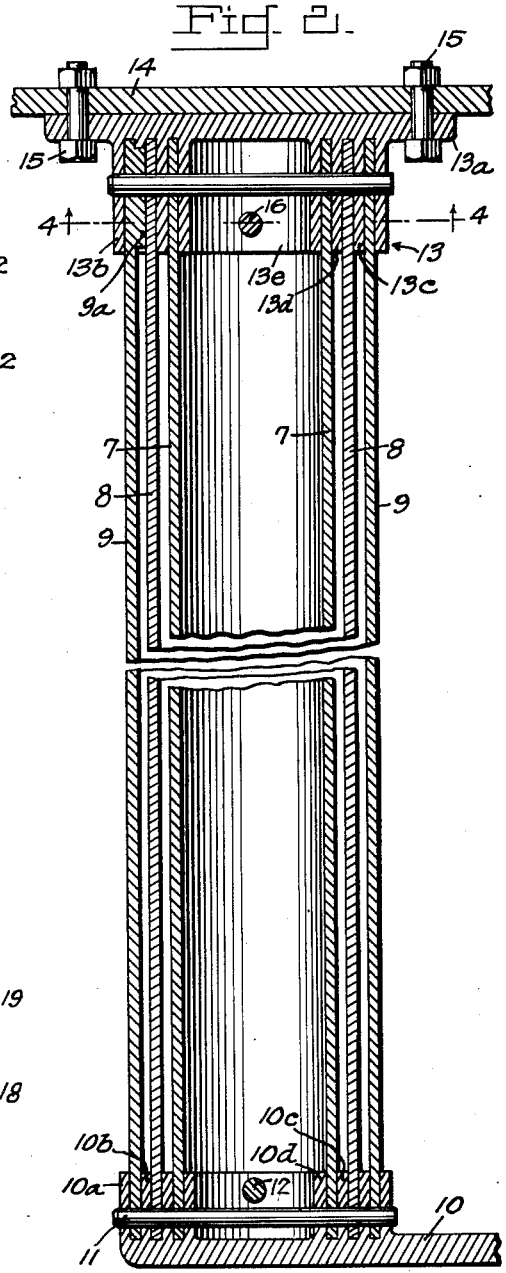
Figure 2 is a section in an axial diametral plane, of a torsion type spring embodying the invention and employing a special hanger for effecting pre-stressing.

At Figure 2 I have shown a torsion spring consisting of three interfitting, coaxial cylindrical tubes 7, 8 and 9, of equal length. These tubes are rigidly connected at their lower end to each other and to a lever or hanger 10. In one suitable connection shown, the end of lever 10 is formed with concentric integral collars 10a, 10b, 10c and 10d forming channels therebetween in which the respective tubes have a smooth fit. One or more pins such as 11 and 12 are then passed through aligned holes in the collars and tubes to unite the parts.

While numerous ways are available for effecting the twisting and resulting pre-stressing of the spring sections, one way of doing this is shown at Figures 2 to 7. In these Figures, 13 indicates generally a special hanger having a flange 13a by which the spring may be attached to a part to be controlled. In Figures 2 and 4, a lever 14 is shown attached to hanger 13, by means of bolts 15 by which torsion may be applied to the tube sections. The hanger 13 has four integral depending concentric collars 13b, 13c, 13d and 13e spaced to form channels within which the ends of the respective tubes may fit.

As shown at Figures 2 and 4, the upper end of the outer tube section 9, has a lug 9a on its inner wall, adapted to be engaged, substantially without play, by a longitudinally-extending slot in collar 13c, to thereby assure correct initial relation of the parts and alignment of certain of the holes. The slot opens downwardly so that it engages the lug by a downward movement of the hanger over the ends of the tubes.

As clearly shown upon Figure 4, each of the tubes and collars has a pair of diametrically opposite holes in its walls, all of said holes being coplanar in a plane normal to the tube axes when the tube ends are fully seated between the collars of the hanger. The holes in the sleeves 13b to 13e are in alignment with each other and with the corresponding holes in the outer tube 9, while the holes in intermediate tube 8 are displaced in one direction of rotation while those in inner tube 7 are displaced in an opposite direction. The amount of angular displacement of the holes will, of course, depend upon the absolute and relative pre-stressing to which the tubes are to be subjected.

In the operation of pre-stressing, the hanger 13 is applied as shown in Figure 4, and a pin 16 is inserted through the aligned holes in collar 13b, tube 9, and collar 13c. Torque is now applied to lever 14 to turn hanger 13 and outer tube 9 counterclockwise relatively to intermediate tube 8 until pin 16 is aligned with the corresponding hole in tube 8. The pin is then moved into the hole whereupon the parts are in the position shown at Figure 5. Next torque is applied clockwise as seen in Figure 4 to turn hanger and connected tubes 8 and 9 until pin 16 is aligned with the hole in inner tube 7, as shown upon Figure 6. Finally, the pin is driven through all of the holes to secure the tubes in stressed relation. If the stresses in tubes 7 and 9 are substantially equal, the parts will move to the approximate position shown at Figure 7 when external torque is released.

Figure 3:
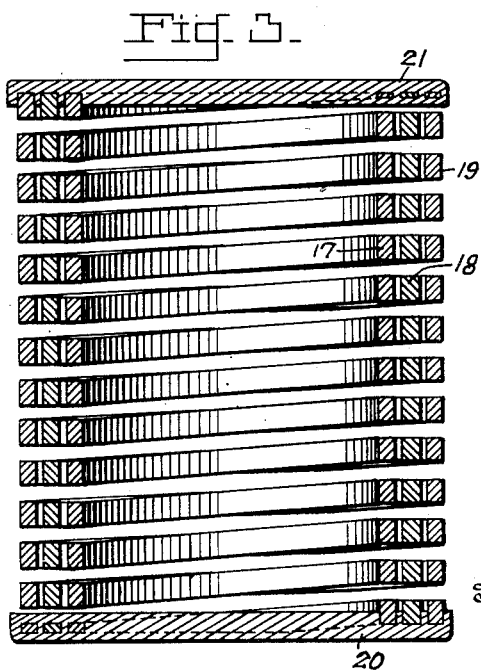
Figure 3 is an axial diametral section of a second form of coil spring utilizing the features of my invention.

In Figure 3, there is disclosed a coil or helical spring, formed from a set of three concentric tubes 17, 18 and 19, assembled and pre-stressed as in Figure 2 and rigidly united at their one ends by a cap 20 and at their other ends by a cap 21. After this assembly, the walls may be cut through along a spiral path to form a coil spring as shown.

Figures 8 and 9 are diagrams indicating the useful result attained by my invention. Figure 8 may be assumed to represent the action of a torsion spring consisting of one solid tube, or it may be taken to represent a three-tube spring without pre-stressing. In the former case, the three graph lines will represent the stresses in the inner, intermediate and outer layers of the unitary tube. In both diagrams, abscissas represent spring deflection and ordinates represent stress. From Figure 8 it will be seen that, as deflection increases, the stresses diverge, that in the outer tube or layer increasing more rapidly than that in the intermediate tube and that in the intermediate tube increasing more rapidly than that of the inner tube. At the maximum indicated spring deflection therefore, the outer tube, is stressed to the approximate permissible approach to the elastic limit of its metal while at the same time, the intermediate and inner tubes are well below the permissible maximum stress.

Figure 9 shows the effect of pre-stressing a multi-section spring in accordance with the invention. By properly pre-stressing the inner and outer sections oppositely and substantially equally, the stresses in the respective sections increase at the same rates as in Figure 8 but converge until, at the maximum deflection, the stresses in all sections are approximately equal. Thus, for a given spring constructed and pre-stressed in accordance with the invention, the maximum deflection may be increased before reaching the limiting stress. Or, conversely, since a spring is ordinarily designed to exert a certain force or torque at a predetermined deflection, a spring constructed in accordance with the invention may be made lighter and require less metal than a solid one of equal capacity. Furthermore, a spring constructed in accordance with the present invention will tend to dampen out vibrations caused by impact and surging at high speeds and will thus reduce failure and breakage since a spring will operate more uniformly and satisfactorily when its maximum stress is well below the elastic limit.

While the foregoing discussion deals with a three-element spring, it will be understood that this is by way of example only. Within limits dictated by practical considerations, the number of elements may be increased as desired. Thus, where a four-element spring is used, the outer and next intermediate sections would be initially negatively stressed while the remaining two sections would be initially positively stressed so that at the maximum deflection for which the spring is intended, all sections are substantially equally stressed. In the claims the term "pre-stressed" is to be interpreted to mean the condition of the part referred to when the composite spring is in normal undeflected position or condition.

Numerous modifications, arrangements, and relative degrees of pre-stressing will occur to those skilled in the art after a study of the foregoing description. Consequently the disclosure should be taken in an illustrative rather than a limiting sense. For example, the several spring sections may be made of metals or alloys having different moduli of elasticity. It is thus my desire and intention to reserve all modifications falling within the scope of the sub-joined claims.

Having now fully disclosed the invention, what I claim and desire to secure by Letters Patent is:

1. A spring comprising a plurality of co-extensive tubular continuous-walled elements telescopically fitting one inside the other, said elements being rigidly united at each end only, one of said elements being stressed in one direction relatively to the remaining said elements in the undeflected position of said spring and another of said elements being stressed in the opposite direction relatively to the remaining elements in the undeflected position of said spring.

2. A composite spring comprising at least three continuous-walled interfitting coaxial tubular elements rigidly united at each end only, at least one of said elements being torsionally pre-stressed in one direction and at least another of said elements being pre-stressed in the opposite direction.

3. A composite spring as recited in claim 2, said elements being wound into the form of a coil spring.

4. In a composite spring, three tubular, co-extensive interfitting continuous-walled elements rigidly connected at corresponding ends only, the inner one of said elements being pre-stressed in torsion in one direction and the outer one of said elements being pre-stressed in the opposite direction when said spring is in undeflected position.

5. A composite spring comprising three freely interfitting telescoped tubes one inside the other, all said tubes being of substantially the same length, and means rigidly uniting all said tubes at their adjacent ends only, the outermost of said tubes being pre-stressed in one direction and the innermost of said tubes being pre-stressed in the opposite direction.

6. A composite spring as recited in claim 5, said outer and inner tubes being pre-stressed to substantially the same degree.

7. A tubular-type spring comprising at least three interfitting, continuous walled coextensive coaxial sections, and means rigidly connecting said sections adjacent their corresponding ends only, at least one inner and one outer of said sections being pre-stressed respectively opposite directions in the undeflected position of said spring.

8. A spring comprising a composite member of at least three interfitting, coextensive, coaxial, continuous-walled tubular elements rigidly secured together at their respective ends, at least two of said elements being torsionally pre-stressed in respectively opposite directions, said member being in the form of a helix.

OWEN W. MARLOW.

References Cited in the file of this patent

UNITED STATES PATENTS

| Number | Name | Date |
|---|---|---|
| 736,333 | Meyer | Aug. 11, 1903 |
| 1,486,295 | Mullen | Mar. 11, 1924 |
| 1,628,561 | Smith | May 10, 1927 |
| 1,988,295 | Berry | Jan. 15, 1935 |
| 2,238,380 | Almen | Apr. 15, 1941 |
| 2,248,447 | Wood | July 8, 1941 |

FOREIGN PATENTS

| Number | Country | Date |
|---|---|---|
| 270,169 | Great Britain | May 5, 1927 |
| 606,635 | Germany | Dec. 6, 1934 |
| 772,052 | France | Aug. 6, 1934 |

OTHER REFERENCES

Ser. No. 345,249, Latscher-Latka (A. P. C.), published May 4, 1943.